United States Patent [19]

Reibetanz et al.

[11] Patent Number: 5,174,588
[45] Date of Patent: Dec. 29, 1992

[54] AUTOMATICALLY LOCKING CHUCK FOR DRILL OR THE LIKE

[75] Inventors: Wilbert Reibetanz, Leinfelden-Echterden; Karl Wanner, Leinfelden-Echterdingen; Otto Baumann, Leinfelden-Echterdingen; Rolf Müller, Leinfelden-Echterdingen, all of Fed. Rep. of Germany

[73] Assignee: Robert Bosch GmbH, Stuttgart, Fed. Rep. of Germany

[21] Appl. No.: 768,957

[22] PCT Filed: Jan. 29, 1991

[86] PCT No.: PCT/DE91/00080

§ 371 Date: Oct. 11, 1991

§ 102(e) Date: Oct. 11, 1991

[87] PCT Pub. No.: WO91/12914

PCT Pub. Date: Sep. 5, 1991

[30] Foreign Application Priority Data

Feb. 23, 1990 [DE] Fed. Rep. of Germany ...... 4005757

[51] Int. Cl.⁵ ............................................. B23B 31/12
[52] U.S. Cl. ................................. 279/62; 279/140; 279/902
[58] Field of Search .............................. 279/60-62, 279/19.3, 19.4, 19, 902, 140; 173/48

[56] References Cited

U.S. PATENT DOCUMENTS

| | | | |
|---|---|---|---|
| 3,506,277 | 4/1970 | Harms | 279/902 X |
| 4,272,087 | 6/1981 | Rohm | 279/62 |
| 4,302,021 | 11/1981 | Rohm | 279/60 |
| 4,621,818 | 11/1986 | Rohm | 279/62 X |
| 4,621,819 | 11/1986 | Rohm | 279/19 X |
| 4,621,820 | 11/1986 | Rohm | 279/19.3 |
| 4,627,626 | 12/1986 | Rohm | 279/19.3 X |
| 4,627,627 | 12/1986 | Rohm | 279/19.3 |
| 4,700,956 | 10/1987 | Rohm | 279/19.4 |
| 4,702,485 | 10/1987 | Rohm | 173/48 X |
| 4,703,941 | 11/1987 | Rohm | 279/62 |

FOREIGN PATENT DOCUMENTS

| | | |
|---|---|---|
| 0017748 | 3/1980 | European Pat. Off. . |
| 0300375 | 1/1989 | European Pat. Off. . |
| 3500201 | 7/1986 | Fed. Rep. of Germany . |
| 3516451 | 11/1986 | Fed. Rep. of Germany . |
| 3617105 | 11/1987 | Fed. Rep. of Germany . |
| 7900629 | 8/1979 | Netherlands ............... 279/60 |
| 1566855 | 5/1980 | United Kingdom ........... 279/60 |
| 2034210 | 6/1980 | United Kingdom ........... 279/60 |

*Primary Examiner*—Steven C. Bishop
*Attorney, Agent, or Firm*—Michael J. Striker

[57] ABSTRACT

A chuck for use in a percussion drill or the like has a unit for securing the chuck jaws against unintentional loosening during operation. The securing unit moves from an unlocked position in which a tool can be received by the chuck jaws to a locked position automatically for drilling operations without the use of a key. The securing unit includes a first surface (22) upon which a sliding member (21) is slidable to be received in a recess (26) during the shaking caused by drilling, so that coupling members (15, 19) between a securing sleeve (17) and a clamping sleeve (13) engage with one another.

15 Claims, 1 Drawing Sheet

AUTOMATICALLY LOCKING CHUCK FOR DRILL OR THE LIKE

BACKGROUND OF THE INVENTION

The invention is related to a hand machine tool, such as a drill, having a locking chuck. A percussion drilling device with drill chuck which is suitable for hand machine tools is disclosed in German Patent Publication DE-C 35 16 451, its adjusting ring for the chuck jaws being secured against rotation by means of a sleeve during operation. The sleeve must be drawn back and locked in order to adjust the chuck jaws. If the user forgets to disengage the lock before operating the tool, the means for securing against rotation are not effective, the chuck jaws can move back and the tool becomes loose during the percussion drilling.

SUMMARY OF THE INVENTION

According to the invention, a chuck for a drill or the like comprises a body having a plurality of jaws, means for adjusting the jaws to receive a tool and means for securing the adjusting means, the securing means being movable from an unlocked position, in which said tool can be received, to a locked position automatically during operation of said drill. The tool can no longer become loose during operation after clamping. This is achieved in that the securing sleeve is automatically guided into its locking position to secure against the rotation of the adjusting ring during the percussion drilling operation. The locking is particularly important in keyless drill chucks whose internal friction is reduced by means of roller bearings.

An advantageous development and improvement of the drill chuck is made possible by a sliding surface, on which a sliding member adheres during the clamping, that is, when the machine is stopped, but slides off during the shaking brought about during operation. The construction of the sliding surface ensures that the securing sleeve is moved into the locking position. The arrangement of a catch recess immediately adjoining the sliding surface, ensures a secure locking of the securing sleeve in the locking position. A sloping guide surface between the sliding surface and the catch recess, enables a smooth unlocking of the securing sleeve. The sliding surface can either be arranged at the securing sleeve or at retaining means such as a rotatable ring connected with the base body. The sliding member is fastened at the retaining means or at the securing sleeve. The construction of the retaining means as a rotatable ring, is an embodiment which is particularly simple and easy to use. The arrangement of two sliding surfaces at both sides of the catch recess, offers the possibility of rotating the ring in any direction during adjustment or of providing one of the sliding surfaces with a locking nose, so that the securing sleeve does not lock into the locking position in this position. This is useful in rotary drilling when a subsequent loosening of the tool is not to be expected. The arrangement of a sliding surface without locking nose, in the rotating direction of the catch recess in which the clamping sleeve is rotated for closing the drill chuck makes it possible for the clamping sleeve and the ring to be gripped simultaneously, so that the ring can be rotated along with it until reaching the stop. Accordingly, it is ensured in a very user-friendly manner that the securing sleeve automatically moves into its locking position during operation in normal cases. The selection of saw teeth as coupling means, ensures that the chuck jaws cannot open when the coupling teeth are offset, but rather, at most, can continue to close. A disk spring, which is arranged between the adjusting ring and the base body or thrust bearing maintains a minimum clamping force even when roof-shaped teeth are used as coupling means instead of the saw teeth. The arrangement of a roller bearing for preventing the axial friction forces during the clamping of the drill chuck, enables a secure clamping by hand without a tool.

The present invention both as to its construction so to its mode of operation, together with additional objects and advantages thereof, will be best understood from the following description of specific embodiments when read in connection with the accompanying drawings.

DETAILED DESCRIPTION OF THE DRAWINGS

Figure 1:
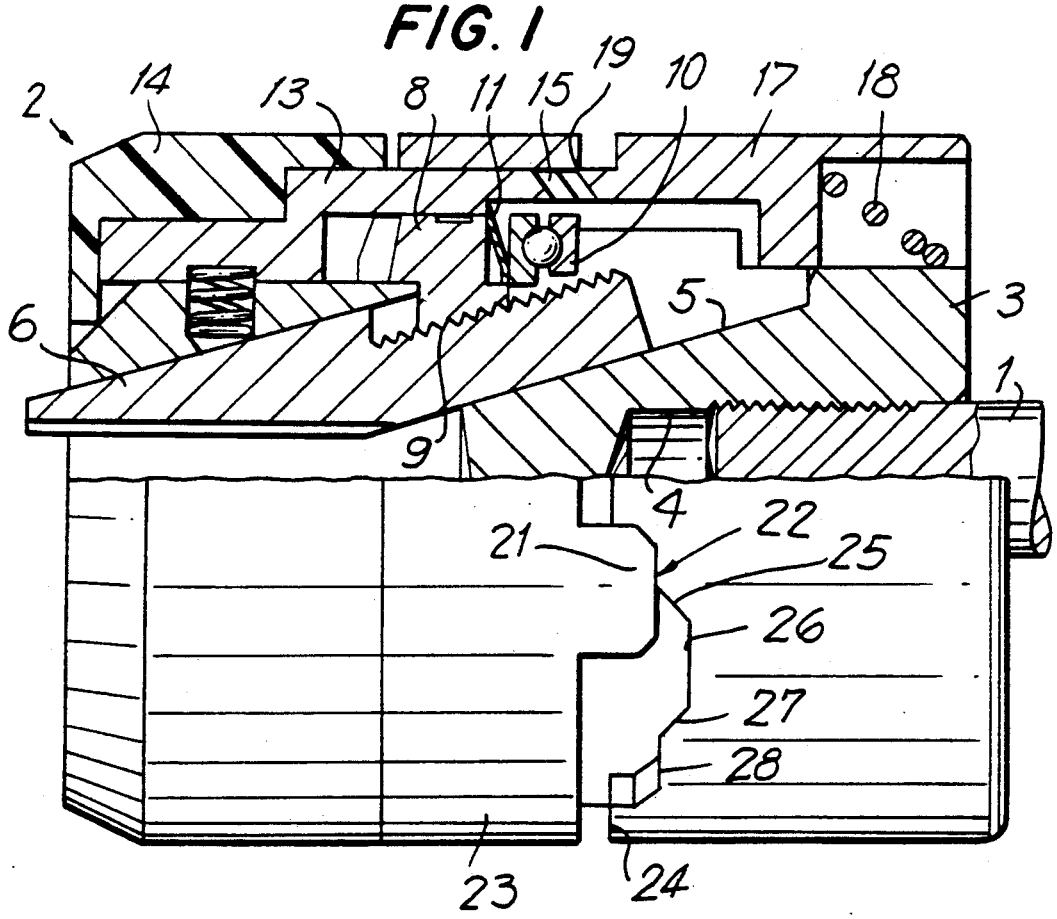
FIG. 1 shows a partial longitudinal section through the spindle and drill chuck of a hand machine tool according to a first embodiment of the invention.

A spindle 1 of a preferably electrically operated hand machine tool is shown in FIG. 1, which spindle 1 is driven in rotation, a keyless drill chuck 2 being screwed onto the latter. The drill chuck 2 comprises a base body 3 in which a threaded hole 4 is arranged for the spindle 1. Three guides 5 for receiving chuck jaws 6 are preferably arranged in the base body 3 diagonally relative to the axis of the base body 3. An adjusting ring 8 with a conical internal thread 9, which communicates with teeth at the chuck jaws 6 in a known manner, is arranged so as to be rotatable around the base body. The adjusting ring 8 is axially supported against the base body 3 via a roller bearing 10. A disk spring 11 is inserted between the bearing 10 and the adjusting ring 8. A clamping sleeve 13, which is partially enclosed by a plastic shell 14 facilitating handling, is connected with the adjusting ring 8 so as to be fixed with respect to rotation relative to the adjusting ring. The shell 14 preferably comprises longitudinal ribs. The clamping sleeve 13 carries a helical gearing in the form of saw teeth or pointed teeth at its front side as coupling means 15.

Moreover, a securing sleeve 17 is arranged on the base body 3 so as to be axially displaceable. A pressure spring 18, which forces the securing sleeve 17 in the direction of the clamping sleeve 13, is inserted between the base body 3 and the securing sleeve 17. The securing sleeve likewise carries a helical gearing 19 in the form of saw teeth or pointed teeth at its front side facing the clamping sleeve 13 as coupling means. The securing sleeve 17 is shown in FIG. 1 in its unlocked position, in which the teeth 15 and 19 do not mesh. In order to move the securing sleeve 17 into its locking position, means 21, 22 are arranged at the securing sleeve 17 and at a ring 23 serving as retaining means. The ring 23 is supported on the clamping sleeve 13 so as to be rotatable in a defined manner and comprises a cam-like sliding member 21 formed as a projection 21. The sliding member 21 faces in the direction of the securing sleeve 17 and contacts a sliding surface 22 of the securing sleeve 17 in the unlocked position. The sliding surface 22 is aligned so as to be almost parallel to a surface which is arranged radially relative to the axis of the securing sleeve 17. It is recessed relative to the edge 24 of the securing sleeve 17 in the axial direction. A sloping guide surface 25 which leads into the catch recess 26 adjoins the sliding surface 22. The catch recess 26 is cut into the securing sleeve 17 and the sliding member 21 is Completely received therein when the ring 23 contacts the edge 24. Another guide surface 27 with adjoining sliding surface 28 is arranged on the other side of the catch recess 26.

Figure 2:
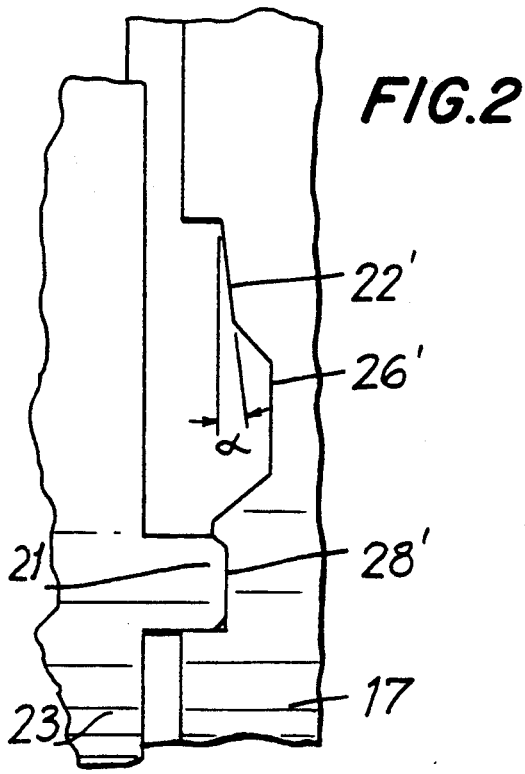
FIG. 2 shows a second embodiment of the invention and means for being moved in the securing sleeve.

In the second embodiment according to FIG. 2, the means for moving in the securing sleeve are shown in section. The ring 23 with sliding member 21 corresponds to the first embodiment shown in FIG. 1. The securing sleeve 17' comprises two sliding surfaces 22' and 28', wherein the sliding surface 22' is inclined at an angle α relative to a radially extending surface.

The angle α lies between 0° and the value of the friction angle between the materials of the sliding surface 22' and the sliding member 21. The second sliding surface 28' is arranged parallel to a radial plane of the securing sleeve 17' and comprises a locking nose 30 at its side facing the notch 26'.

Figure 3:
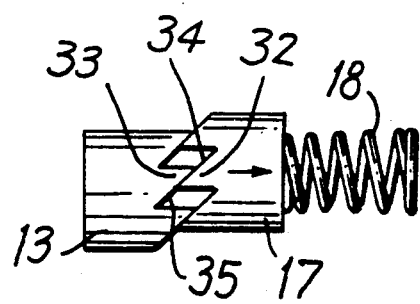
FIG. 3 shows means for coupling the securing sleeve.

The coupling means 15 and 19 at the clamping sleeve 13 and the securing sleeve 17 are shown schematically in FIG. 3. The coupling means comprise saw teeth 32 and 33 which are arranged so as to correspond to one another. Their sloping surfaces 34, 35 are arranged in such a way that they act in the closing direction of the drill chuck. In order to clamp a tool, the ring 23 is first rotated until the sliding member 21 comes to rest on one of the sliding surfaces 22, 28. In this state, the securing sleeve is unlocked. The clamping sleeve 13 can now be opened and closed, respectively, without contact of the coupling means 15, 19. When the tool is inserted, the clamping sleeve 13 is gripped at the shell 14 by hand and turned, normally in the clockwise direction. The axial bearing 10 reduces the internal friction in the drill chuck 2 until the clamping force, which can be applied by hand, is sufficient for clamping a drilling tool. Other handles for locking the drill chuck are no longer necessary.

Strong shaking occurs at the drill chuck when operating the drill chuck with a percussion drilling machine, which shaking allows the sliding member 21 to slide along the sliding surface 22 into the catch recess 26. In so doing, the sliding member 21 rotates together with the ring 23 relative to the radially fixed securing sleeve. This leads to an axial displacement of the securing sleeve 17 and to the meshing of the coupling means 15, 19. In case the saw teeth 32, 33 do not mesh completely, the sloping surfaces 34, 35 act in such a way that the chuck jaws are further clamped.

In case a locking of the securing sleeve 17 is not required, e.g. for purely rotary drilling, one or both of the sliding surfaces 22', 28' can be provided with locking noses 30, so that the securing sleeve 17 does not lock automatically either when clamping or in operation.

The invention is not limited to the described embodiment examples. In particular, the automatically acting means for moving in the securing sleeve can also be used in a so-called conical jaw chuck in which the conical sleeve, instead of the adjusting ring, is to be locked relative to the base body.

The relative movement between the sliding member and sliding surface need not be a rotational movement. The ring with the sliding member can also be constructed, e.g. as a radially movable pin which is pressed in for unlocking the securing sleeve and moves out radially for locking.

While the invention has been illustrated and described as embodied in a hand tool with an adjustable chuck, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

We claim:

1. A chuck for a drill or the like, comprising:
a body (3) having a plurality of jaws (6);
means (8) for adjusting said plurality of jaws relative to one another to receive a tool; and
means (17) for securing said adjusting means (8), said securing means being movable from an unlocked position in which said jaws can be opened and said tool can be received by said jaws, to a locked position in which said jaws are clamped, automatically during operation of said drill due to shaking of the chuck.

2. The chuck according to claim 1, further including means (11) for biasing said adjusting means (8) against said body (3).

3. The chuck according to claim 2, wherein said biasing means (11) is a disk spring.

4. A chuck for a drill or the like, comprising:
a body (3) having a plurality of jaws (6);
means (8) for adjusting said plurality of jaws relative to one another to receive a tool; and
means (17) for securing said adjusting means (8), said securing means being movable from an unlocked position in which said jaws can be opened and said tool can be received by said jaws, to a locked position in which said jaws are clamped automatically during operation of said drill due to shaking of the chuck, said securing means (17) including a sliding member (21) formed as a projection, a first surface (22) facing said member (21) and a second surface (23) also facing said member (21), said first and second surfaces being slidable against one another, said first surface (22) being substantially parallel to an inclined with respect to a plane positioned radially with respect to the axis of said securing means.

5. The chuck according to claim 4, wherein said first and second surface (22, 28) each have a slop no greater than an angle between said first and second surfaces and said sliding member (21).

6. The chuck according to claim 4, wherein said securing means (17) further includes a recess (26) for receiving said sliding member (21).

7. The chuck according to claim 6, wherein said securing means (17) further includes a first guide surface (25) positioned between said first surface (22), said recess (26) and a second guide surface (27) being positioned between said second surface (28) and said recess (26).

8. The chuck according to claim 4, further including means (23) for retaining said securing means (17) in said locked position, said retaining means being connected axially with said body (3) and said sliding member (21) being positioned at said retaining means, said first and second surfaces (22, 28) being positioned at said securing means.

9. The chuck according to claim 8, wherein said retaining means (23) includes a ring-like member which is rotatable with respect to said body (3) such that said securing means (17) can be moved from said unlocked position to said locked position when said securing means is rotated with respect to said retaining means (23).

10. The chuck according to clam 6, wherein said first surface (22) is positioned at one side of said recess (26) and said second surface (28) is positioned at another side of said recess (26).

11. The chuck according to claim 6, further including a locking member positioned at at least one of said first and second surfaces (22', 29'), said locking member (30) being positioned to face said recess (26').

12. The chuck according to clam 6, further including means (13) for clamping said tool in said plurality of jaws (6), said clamping means being connected to said adjusting means and said first surface (22) being positioned in a direction of rotation of said recess (26) such that said clamping means (13) can be rotated for closing said chuck (2).

13. The chuck according to claim 12, wherein said clamping means (13) includes a first coupling (15) having a plurality of teeth (33) each with a first sloped surface (35), and said securing means (17) includes a second coupling (19) having another plurality of teeth (32) each with a second sloped surface (34), said first and second sloped surfaces (34, 35) being arranged to correspond and coact to close said chuck (2).

14. The chuck according to claim 1, further including a roller bearing (10) for supporting said adjusting means (8) axially against said bidy (3).

15. A hand machine tool employed for percussion drilling, the hand machine tool comprising a machine tool part; and a keyless drill chuck for holding a tool and including a body 3 having a plurality of jaws (6), means (8) for adjusting said plurality of jaws relative to one another to receive said tool, and means (17) for securing said adjusting means (8), said securing means being movable from an unlocked position said jaws can be opened and, and in which said tool can be received by said jaws, to a locked position in which said jaws are clamped, automatically during operation of said drill due to shaking of the chuck.

* * * * *